United States Patent Office 3,534,432
Patented Oct. 20, 1970

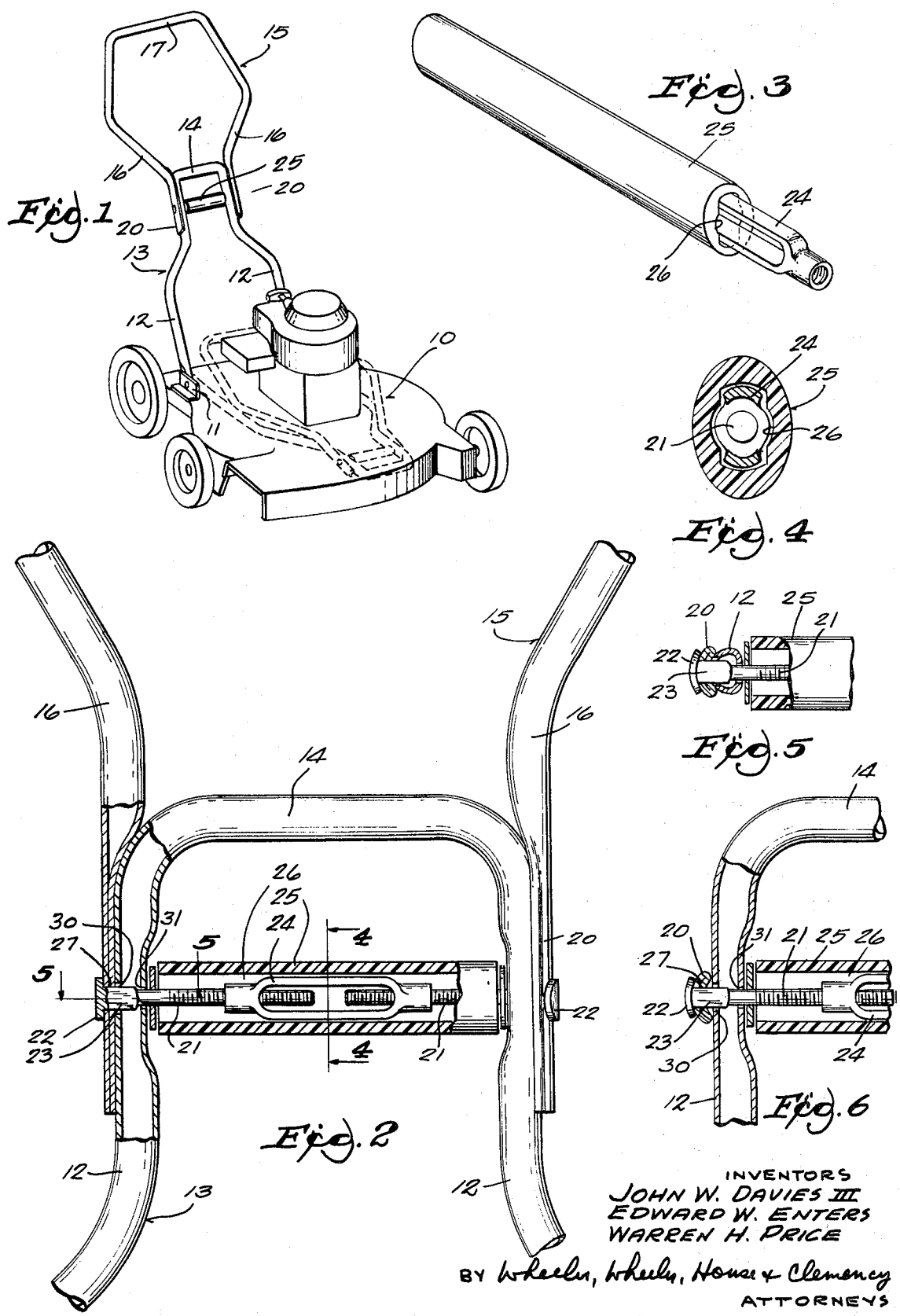

3,534,432
FOLDING HANDLE
John W. Davies III, Plymouth, Edward W. Enters, Fredonia, and Warren H. Price, Sheboygan, Wis., assignors to Gilson Bros. Co.
Filed Nov. 19, 1968, Ser. No. 777,051
Int. Cl. B62b *11/00*
U.S. Cl. 16—110                    8 Claims

ABSTRACT OF THE DISCLOSURE

This disclosure relates to a folding handle of the type adapted for use on various indoor and outdoor implements, such as a power lawn mower, snow blower, etc. There are two U-shaped handle sections pivotally connected in tandem on axially aligned bolts. The threaded ends of the bolts are interconnected by a turnbuckle by which both bolts are concurrently tightened and loosened. A handle sleeve is disposed about the turnbuckle to serve as a grip by which the turnbuckle is turned to selectively tighten and loosen the bolts.

BACKGROUND OF THE INVENTION

Typical folding handles in the prior art incorporate separate pivot pins or bolts which are independently manipulated for the purpose of tightening and loosening the bolts in the course of folding and unfolding the handle.

SUMMARY OF THE INVENTION

In accordance with the present invention, the axially aligned bolts have their threaded ends interconnected by a turnbuckle which is surrounded by a handle sleeve which functions as a grip by which the turnbuckle is manipulated to simultaneously loosen or tighten the two bolts. This facilitates and speeds up the process of folding and unfolding the handle and provides an easy and simplified built-in wrench mechanism which eliminates the need to resort to tools to manipulate the bolts.

Other objects, features, and advantages of the invention will appear from the following disclosure.

DESCRIPTION OF THE DRAWINGS

FIG. 1 is a perspective view of a power lawn mower provided with a folding handle embodying the invention.

FIG. 2 is an enlarged view, partly in cross section, showing the interconnection of the two handle sections and details of the turnbuckle.

FIG. 3 is a perspective view showing the relationship between the turnbuckle and the grip sleeve.

FIG. 4 is a cross section taken along the line 4—4 of FIG. 2.

FIG. 5 is a cross section taken along the line 5—5 of FIG. 2.

FIG. 6 is a fragmentary view, partly in cross section, similar to FIG. 2, but showing the position of the parts when the upper section of the handle has been swung to its folded position, as shown in broken lines in FIG. 1.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The power lawn mower 10 of FIG. 1 typifies any one of various implements to which it is advantageous to affix a folding handle. Near its rear end the lawn mower 10 has upstanding brackets 11 to which the free ends of arms 12 of a lower handle section 13 are pivotally connected. At their other ends the arms 12 are interconnected by a U-shaped bight 14.

The upper handle section 15 also is provided with free or open ended arms 16 and a U-shaped bight 17. The handle sections are desirably made of metal tube, appropriately bent, as indicated in the drawings, to a convenient handle configuration.

The two handle sections 13, 15 are interconnected in tandem. The arms 16 of the upper handle section 15 embrace the bight end of the lower section. For this purpose the end portions 20 of the tubular arms 16 are squeezed to a configuration shown in FIGS. 5 and 6 in which the end portions 20 form a saddle or groove into which the tubular arms 12 interfit in longitudinal alignment when the handle is in its unfolded full line position shown in FIG. 1. The arms 12 function as ribs, and the arm extensions 20 function as grooves to mechanically interlock the two handle sections.

The two sections 13, 15 are held together but are allowed to pivot, as hereinafter described, by reason of a pair of bolts 21 which extend through aligned openings formed in the arms 12 and arm ends 20. Each bolt 21 has an enlarged head 22 which is desirably curved, as shown in FIGS. 5 and 6, to hug the curved outer configuration of the arm ends 20. Beneath the head 20 each bolt is desirably formed with an axially extending square cross section shoulder 23. Beyond the shoulder 23 the shank of bolt 21 is threaded.

The respective threaded shanks of the bolts 21 are interconnected by a turnbuckle 24 which is surrounded by a grip sleeve 25 desirably made of plastic molded with an interior cavity 26 which fits the turnbuckle 24 to mechanically interlock the grip sleeve and the turnbuckle. Accordingly, the operator turns the grip 25 to turn the turnbuckle 24 and simultaneously loosen or tighten the respective bolts 21. The grip 25 functions as a built-in, hand-operated wrench for turning the bolts.

The holes 27 through the arm ends 20 are desirably squared so as to key with the square shoulder 23 on bolts 21, thus to restrain the bolts 21 from turning as the turnbuckle 24 is turned. Accordingly, rotation of the turnbuckle 24 will develop only axial movement of the bolts 21. Of course, any non-circular keying configuration of shoulder 23 and hole 27 can be used.

When the bolts 21 are loosened, the bolt heads 22 will extend outwardly to their position shown in FIG. 6, to unclamp the arms 12 from within the saddles in the arm ends 20 and provide sufficient clearance to permit the top handle section 15 to be folded to its broken line position in FIG. 1.

The hole 30 in the outboard side of arm 12 is larger in diameter than the greatest cross section of the square shoulder 23. Accordingly, the shoulder 23 can rotate freely within this opening. The hole 31 on the inboard side of the arm 12 is just slightly larger than the diameter of the threaded portion of bolt 21, also to permit free turning of the bolt therewithin.

The rib and groove configuration of the facing surfaces of the corresponding arms 12, 20 of the two handle sections 13, 15 interlocks the handles in unfolded full line position shown in FIG. 1. In order to fold the handle, the operator simply turns the grip 25 which simultaneously loosens both bolts 21 and allows lateral separation of the arms 12, 20. As soon as the bolts are loosened sufficiently so that arms can clear, the top handle section 15 can be swung to its broken line position shown in FIG. 1. To restore the handle to its unfolded position, it is simply swung back to full line position, and the grip 25 is turned in the opposite direction to turn the turnbuckle and tighten the bolts 21, thereby relocking the rib and groove connection between the respective overlapping arms 12, 16.

The cavity 26 in grip 25 is sufficiently larger than the turnbuckle 24 to fit loosely thereon, and to be free for limited floating movement axially thereof. The grip 25 has a length approximately equal to or slightly less than the spacing between the handle arms 12. When the turnbuckle is tightened, the arms 12 tend to be clamped under pressure of the screws 21 against the ends of the griy 25, which then functions as a spacer, thus to rigidify the interconnection of the handle sections 13, 15 in unfolded position. By its freedom to float axially, the grip 25 equalizes the tension on the two screws 21 when the turnbuckle is tightened. When tightened, the turnbuckle 24 and screws 21 function as a strut in tension and will impose compressive force on the cross piece or bight 14. This combination of forces also contributes to the rigidity of the handle interconnection.

While one common form of turnbuckle 24 is illustrated, any other form suited for the purposes of the invention can be substituted therefor.

By folding the handle, storage and shipping space requirements are reduced, yet the handle can be unfolded without need to resort to tools.

What is claimed is:

1. A folding handle comprising two handle sections each having laterally spaced arms, corresponding arms of each handle section being overlapped in lateral alignment, axially aligned bolts pivotally connecting said corresponding arms, and a turnbuckle interconnecting said bolts and by which said bolts are selectively tightened and loosened.

2. The folding handle of claim 1 in which there is a key between the head of each bolt and one of the arms, thus to key the bolts against turning as the turnbuckle is turned.

3. The folding handle of claim 1 in which facing surfaces of said corresponding arms are configured to interlock said arms together when the handle is unfolded.

4. The folding handle of claim 3 in which the facing arm configuration comprises a rib and groove which interfit when the turnbuckle is turned to tighten the bolts and which can be separated when the turnbuckle is turned to loosen the bolts.

5. The folding handle of claim 1 in which both handle sections have U-shaped bights, the bight of one handle being embraced by the arms of the other handle section to connect said sections in tandem, said turnbuckle extending in substantially parallel spaced relation to said bight.

6. The folding handle of claim 1 in which there is a grip about said turnbuckle and by which said turnbuckle is turned to selectively tighten and loosen said bolts.

7. The folding handle of claim 6 in which said grip is free to float axially on said turnbuckle.

8. The folding handle of claim 6 in which the grip has a length approximately equal to or slightly less than the spacing between the handle arms, thus to function as a spacer against which the arms tend to be clamped when the turnbuckle is tightened and rigidify the interconnection of the handle sections in unfolded position.

References Cited

UNITED STATES PATENTS

| | | | |
|---|---|---|---|
| 2,727,753 | 12/1955 | Johnson et al. | 280—47.37 |
| 3,136,574 | 6/1964 | Pasquale | 16—110 XR |
| 3,203,707 | 8/1965 | Anderson | 280—47.37 |
| 3,485,017 | 12/1969 | Duran et al. | 16—110 XR |

DONALD A. GRIFFIN, Primary Examiner

U.S. Cl. X.R.

280—47.37